(12) United States Patent
Wen

(10) Patent No.: US 9,407,496 B2
(45) Date of Patent: Aug. 2, 2016

(54) METHOD AND APPARATUS FOR PATH SWITCHING

(75) Inventor: Gan Wen, Beijing (CN)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 91 days.

(21) Appl. No.: 14/344,588

(22) PCT Filed: Sep. 27, 2011

(86) PCT No.: PCT/CN2011/001630
§ 371 (c)(1),
(2), (4) Date: Mar. 12, 2014

(87) PCT Pub. No.: WO2013/044408
PCT Pub. Date: Apr. 4, 2013

(65) Prior Publication Data
US 2014/0328166 A1    Nov. 6, 2014

(51) Int. Cl.
| H04L 12/26 | (2006.01) |
| H04L 12/24 | (2006.01) |
| H04L 12/707 | (2013.01) |
| H04L 12/703 | (2013.01) |

(52) U.S. Cl.
CPC ............ *H04L 41/0663* (2013.01); *H04L 45/22* (2013.01); *H04L 45/28* (2013.01)

(58) Field of Classification Search
None
See application file for complete search history.

(56) References Cited

U.S. PATENT DOCUMENTS

| 7,518,985 | B2* | 4/2009 | Sugawara et al. ............. 370/217 |
| 2005/0243712 | A1* | 11/2005 | MacKinnon .............. H04L 1/22 370/216 |
| 2007/0258715 | A1* | 11/2007 | Androni ................. H04J 14/02 398/164 |
| 2008/0117912 | A1* | 5/2008 | He .......................... H04L 45/00 370/392 |
| 2008/0291910 | A1 | 11/2008 | Tadimeti et al. |
| 2009/0109843 | A1* | 4/2009 | Yang ....................... H04L 12/66 370/225 |
| 2009/0285574 | A1* | 11/2009 | Liu .................................. 398/2 |
| 2011/0292813 | A1* | 12/2011 | Dunbar .............. H04L 12/4641 370/244 |
| 2012/0213225 | A1* | 8/2012 | Subramanian et al. ....... 370/392 |
| 2012/0239965 | A1* | 9/2012 | Wu et al. ........................ 714/4.1 |
| 2012/0281526 | A1* | 11/2012 | Singamsetty ........... H04L 43/10 370/225 |

FOREIGN PATENT DOCUMENTS

| CN | 1635754 A | 7/2005 |
| CN | 101146016 A | 3/2008 |
| CN | 101827034 A | 9/2010 |
| WO | WO-02082720 A2 | 10/2002 |

OTHER PUBLICATIONS

International Preliminary Report, Application No. PCT/CN2011/001630, Apr. 10, 2014, 1 page.

(Continued)

*Primary Examiner* — Phirin Sam
(74) *Attorney, Agent, or Firm* — Nicholson De Vos Webster & Elliott LLP

(57) ABSTRACT

The present invention discloses a path switching method and apparatus in a network comprising at least a first path and a second path. For an incoming traffic flow, it is determined that any of tunnels on the first path of all levels into which the incoming traffic flow is multiplexed is of a failure status. The incoming traffic flow is then forwarded via the second path. Herein, for the first path, one or more traffic flows are multiplexed into a tunnel, and one or more higher level tunnels are multiplexed into a lower level tunnel.

20 Claims, 3 Drawing Sheets

(56) References Cited

OTHER PUBLICATIONS

International Preliminary Report, Application No. PCT/CN2011/001630, Apr. 1, 2014, 1 page.
Written Opinion of the International Searching Authority, Application No. PCT/CN2011/001630, Jul. 5, 2012, 4 pages.
International Search Report, Application No. PCT/CN2011/001630, Jul. 5, 2012, 2 pages.
European Search Report for Application No. EP11873154.6, mailed Nov. 27, 2015, 8 pages.

* cited by examiner

METHOD AND APPARATUS FOR PATH SWITCHING

CROSS-REFERENCE TO RELATED APPLICATIONS

This application is a National stage of International Application No. PCT/CN2011/001630, filed Sep. 27, 2011, which are hereby incorporated by reference.

TECHNICAL FIELD

The present invention relates to communication technology, and more particularly, to a method and apparatus for path switching in a communication network.

BACKGROUND

In a typical communication network, traffic flows are transmitted in tunnels aggregated/multiplexed in hierarchy. For example, in a Multi-Protocol Label Switching-Transport Profile (MPLS-TP) network, traffic flows can be transmitted in such a hierarchy that one or more traffic flows are multiplexed into a Pseudo Wire (PW), one or more PWs are multiplexed into a Label Switch Path (LSP), and one or more LSPs are multiplexed into a section.

As an example, FIG. 6 shows a conventional configuration of network protection in such a hierarchical network. As shown, two traffic paths are set up between the edge node A and the edge node C, that is, a working path through the core node D and a protection path through the core node B. Initially, two traffic flows, #1 and #2, are multiplexed and transmitted over the working path. In the case where a failure occurs in e.g., the physical link between the node C and the node D, an Operation, Administration and Management (OAM) protocol running on the working path will detect the failure and both traffic flows transmitted over the working path should be switched to the protection path.

As known in the art, in 1+1 protection mechanism, traffic data will be broadcasted on both the working path and the protection path, so that the protection switching will be performed on the sink node (the node D in this case) by selecting the un-distorted traffic flow. In 1:1, 1:n or Fast Re-Routing protection mechanism, the traffic will not be broadcasted on both paths and thus the protection switching needs to performed on a source node (the node A in this case), or an intermediate node, typically by switching the next hop information for traffic flows (packets) from the working path to the protection path.

In order to determine the next hop information for an incoming traffic flow, in a conventional switching or routing system, a forwarding key is first extracted from the flow (packet), such as a destination Media Access Control (MAC) address and a Virtual Local Area Network (VLAN) ID for an Ethernet frame, a LSP label for a MPLS packet or an IP destination address for an IP packet. Then, the next hop information can be searched and determined based on the forwarding key. When a network failure occurs and the traffic flow needs to be switched from the working path to the protection path, there are conventionally two approaches for enabling the switching node to forward the traffic flow to the next hop in the protection path. One approach is to directly change the next hop information of the traffic flow to the protection path. According to the other approach, the switching node can maintain for each traffic flow the next hop information in both the working path and the protection path as well as an associated status. If a traffic flow needs to be switched to the protection path due to a network failure, the status of the traffic flow can be changed from a normal status to a failure status such that the switching node can select the next hop information for forwarding the traffic flow based on the failure status. However, both approaches may impose heavy workload on the switching node which carries out the protection switching when a large amount of traffic flows are involved, since, in case of a network failure, all the involved traffic flows need to be switched to the protection path and switching node needs to sequentially determine and change the next hop information or the status for each of these traffic flows.

It will be problematic if there are a large amount of next hop indexes (or next hop information) or traffic flow statuses to be changed. This process may exhaust the CPU I/O bandwidth and thus may inversely affect other CPU applications. Even more importantly, a number of traffic flows may fail to satisfy the switching time requirement (typically 50 ms) due to the slow process.

SUMMARY

It is an object of the present invention to overcome at least one of the above defects in the prior art.

In order to achieve the object, a path switching method in a network comprising at least a first path and a second path is provided. For an incoming traffic flow, it is determined that any of tunnels on the first path of all levels into which the incoming traffic flow is multiplexed is of a failure status. The incoming traffic flow is then forwarded via the second path. Herein, for the first path, one or more traffic flows are multiplexed into a tunnel, and one or more higher level tunnels are multiplexed into a lower level tunnel.

According to another aspect of the present invention, a path switching apparatus in a network comprising at least a first path and a second path is provided. The apparatus comprises a failure status determining unit configured to determine, for an incoming traffic flow, whether any of tunnels on the first path of all levels into which the incoming traffic flow is multiplexed is of a failure status. The apparatus further comprises a forwarding unit configured to forward the incoming traffic flow via the second path, if the failure status determining unit determines that any of tunnels on the first path of all levels into which the incoming traffic flow is multiplexed is of the failure status. Herein, for the first path, one or more traffic flows are multiplexed into a tunnel, and one or more higher level tunnels are multiplexed into a lower level tunnel.

The concept of aspects of the present invention is based on the following facts. In a typical communication network, traffic flows are multiplexed into a (highest level) traffic tunnel and higher level traffic tunnels are multiplexed into a lower level traffic tunnel. If a lower level tunnel is failed, the higher level tunnels multiplexed into the lower level tunnel are failed accordingly. The higher level tunnels cannot recover from the failure if the corresponding lower level tunnel is in a failure status. Additionally, the failure detection mechanisms for different levels may be independent from each other. In response to the detection of a failure status on a tunnel, all the traffic flows multiplexed, directly or indirectly, into the level tunnel can be immediately switched to the protection path.

According to aspects of the present invention, the inherent multiplexing hierarchy of the communication network is utilized for path switching. And a traffic flow can be switched from the working path to the protection path if a failure status is detected for any of tunnels of all levels into which it is multiplexed. With the present invention, the reliability of the protection switching can be improved and the amount of information required to be changed before the protection switching, and thus the switching latency, can be significantly reduced.

BRIEF DESCRIPTION OF THE DRAWINGS

The above and other objects, features and advantages will be more apparent from the following description of embodiments with reference to the figures, in which.

DETAILED DESCRIPTION OF PREFERRED EMBODIMENTS

The embodiments of the present invention will be detailed below with reference to the drawings. It should be noted that the following embodiments are illustrative only, rather than limiting the scope of the present invention.

Figure 1:
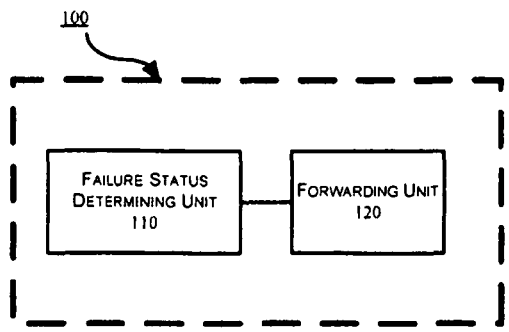
FIG. 1 is a block diagram of the path switching apparatus according to an embodiment of the present invention.

FIG. 1 is a block diagram of the path switching apparatus 100 according to an embodiment of the present invention. The apparatus 100 operates in a network comprising at least a first path (e.g., a working path) and a second path (e.g., a protection path). In this context, the apparatus 100 can be any node in the network which is capable of protection switching, such as but not limited to an ingress edge router in a MPLS domain. As shown, the apparatus 100 comprises a failure status determining unit 110 and a forwarding unit 120. It can be appreciated by those skilled in the art that the apparatus 100 may further comprise other units/components necessary for the operation of the apparatus, whose description is omitted here so as not to obscure the concept of the present invention. Also, each of the units 110 and 120 can be implemented in hardware, firmware or software, i.e., by a dedicated circuit component or by an appropriately programmed processor.

The network in which the apparatus 100 operates can be any known or future communication network. In this network, at least the working path is organized in hierarchy. In other words, for the first path, one or more traffic flows are multiplexed into a tunnel, and one or more higher level tunnels are multiplexed into a lower level tunnel. According to an embodiment, the working path and the protection path can be interchanged with each other.

The failure status determining unit 110 is configured to determine, for an incoming traffic flow, whether any of tunnels on the first path of all levels into which the incoming traffic flow is multiplexed is of a failure status.

The forwarding unit 120 is configured to forward the incoming traffic flow via the second path, if the failure status determining unit 110 determines that any one of tunnels on the first path of all levels into which the incoming traffic flow is multiplexed is of the failure status.

Next, the operations and functions of the respective units in the apparatus 100 will be further detailed with reference to FIG. 3, which illustrates an exemplary path switching process of the present invention.

In the context of the present invention, the multiplexing hierarchy for the working path contains a number of M levels and is represented by "group". That is, in the working path, traffic flows which are multiplexed into the same level M (the highest level) tunnel can be mapped into a "group" (level M group). Also, in the working path, higher level (level i+1) tunnels which are multiplexed into the same immediately lower level (level i) tunnels can be mapped into a "group" (level i group), where i is an integer satisfying $1 \le i \le M-1$. In other words, a level M group corresponds to a level M tunnel in the working path into which one or more traffic flows are multiplexed, and a level i group corresponds to a level i tunnel in the working path into which one or more level i+1 tunnels are multiplexed.

Generally, an incoming traffic flow carries one or more forwarding keys for switching/routing. For example, the forwarding keys can be a destination MAC address and a VLAN ID for an Ethernet frame, a LSP label for a MPLS packet or an IP destination address for an IP packet.

For an incoming traffic flow, a next hop determining unit (not shown) of the apparatus 100 extracts a forwarding key from the traffic flow, and determines both a next hop in the first path and a next hop in the second path by referencing a forwarding table based on the extracted forwarding key. As shown in FIG. 3, the forwarding table holds, for each forwarding key, a next hop index for the working path, a next hop index for the protection path and a group index for the highest level (level M). The search key for this table, i.e., the forwarding key, can be application specific. However, the next hop determining unit is not essential to the present invention. The solution of the present invention does no rely on any specific unit/step for determining the next hops in the first and the second paths for a traffic flow.

In addition to the forwarding table, the apparatus 100 may maintain a next hop working table, a next hop protection table, and a number of M group tables each for one of the M levels.

The next hop working table holds the next hop information for the working path, such as the next hop header information, output ports number, etc. The search key for this table is the next hop index for the working path as output from the forwarding table. The next hop information for the working path can be retrieved from the next hop working table and the forwarding unit 120 can forward a traffic flow in the working path based on the retrieved next hop information.

The next hop protection table holds the next hop information for the protection path, such as the next hop header information, output ports number, etc. The search key for this table is the next hop index for the protection path as output from the forwarding table. The next hop information for the protection path can be retrieved from the next hop protection table and the forwarding unit 120 can forward a traffic flow in the protection path based on the retrieved next hop information.

A level i group table holds the grouping relationship as well as a group status for each level i group. That is, each entry of level i group table is associated with a level i group corresponding to a level i traffic tunnel. The grouping relationship of a group is identified by its group index. If a level i+1 group $S_{i+1}$ has its group index indexed to a level i group $S_i$, then the group $S_{i+1}$ belongs to the group $S_i$, i.e., $S_i \in S_{i+1}$, which means that the corresponding level i+1 traffic tunnel is created on, or multiplexed into, the corresponding level i traffic tunnel. Obviously, for a packet flow F, there will be a unique group sets satisfying the grouping relationship of $F \in S_{Mi} \in \ldots \in S_{ik} \in \ldots \in S_{ln}$, where $S_{xy}$ represents the y-th group on level x. The group status can be simply a binary bit indicating whether the corresponding traffic tunnel is of a failure state or a normal state. According to the present invention, a traffic flow will be forwarded via the working path if and only if all the groups to which it belongs are in normal state; otherwise, it will be forwarded via the protection path.

The above tables can be established according to the following process. First, for an incoming traffic flow, the next hop information for both the working path and the protection path is configured, either manually or by means of signaling. Then it is identified if the next hop information for the traffic flow exists in the next hop working table and the next hop protection table. If the next hop information exists, the next hop index for the traffic flow is indexed to the existing next hop information entry. Otherwise, a new next hop information entry is created in next hop working and protection tables and the next hop index is indexed to the created entry. Then, it is identified if the traffic flow belongs to an existing highest level (level M) group. If so, the group index in the forwarding table is indexed to the existing level M group entry; otherwise, a new group is created in level M group table and the group index in the forwarding table is indexed to the created level M group. Next, for level i(i=1, 2, . . . m−1) group table, it is identified if the level i+1 group, to which the traffic flow belongs, belongs to an existing level i group. If so, the level i+1 group index is indexed to the existing level i group entry; otherwise, a new level i group is created and the level i+1 group index is indexed to the created level i group.

As discussed above, by referencing the forwarding table based on the forwarding key, the group index for the highest level (level M), i.e., level M group index, can be obtained for a traffic flow. The level M group index is then used for obtaining the level M group status, i.e., the status of the level M tunnel, as well as the level M−1 group index, by referencing the level M group table. The level M−1 group index is in turn used for obtaining the level M−1 group status, i.e., the status of the level M−1 tunnel, as well as the level M−2 group index, by referencing the level M−1 group table, and so on. In this way, the failure status determining unit 110 can determine the status of each tunnel on the first path of all levels into which the incoming traffic flow is multiplexed. In other words, the failure status determining unit 110 can be further configured to judge, from the highest level tunnel, whether the tunnel on each of the levels into which the incoming traffic flow is multiplexed is of the failure status. However, such determination order from the highest to the lowest level is only an embodiment of the present invention. The present invention is not limited to this determination order. For example, the failure status determining unit 110 can determine the statuses of all of the levels concurrently. In this case, for example, by referencing the forwarding table based on the forwarding key, the group index for each of the levels (levels 1 to M) can be obtained for a traffic flow.

Figure 3:
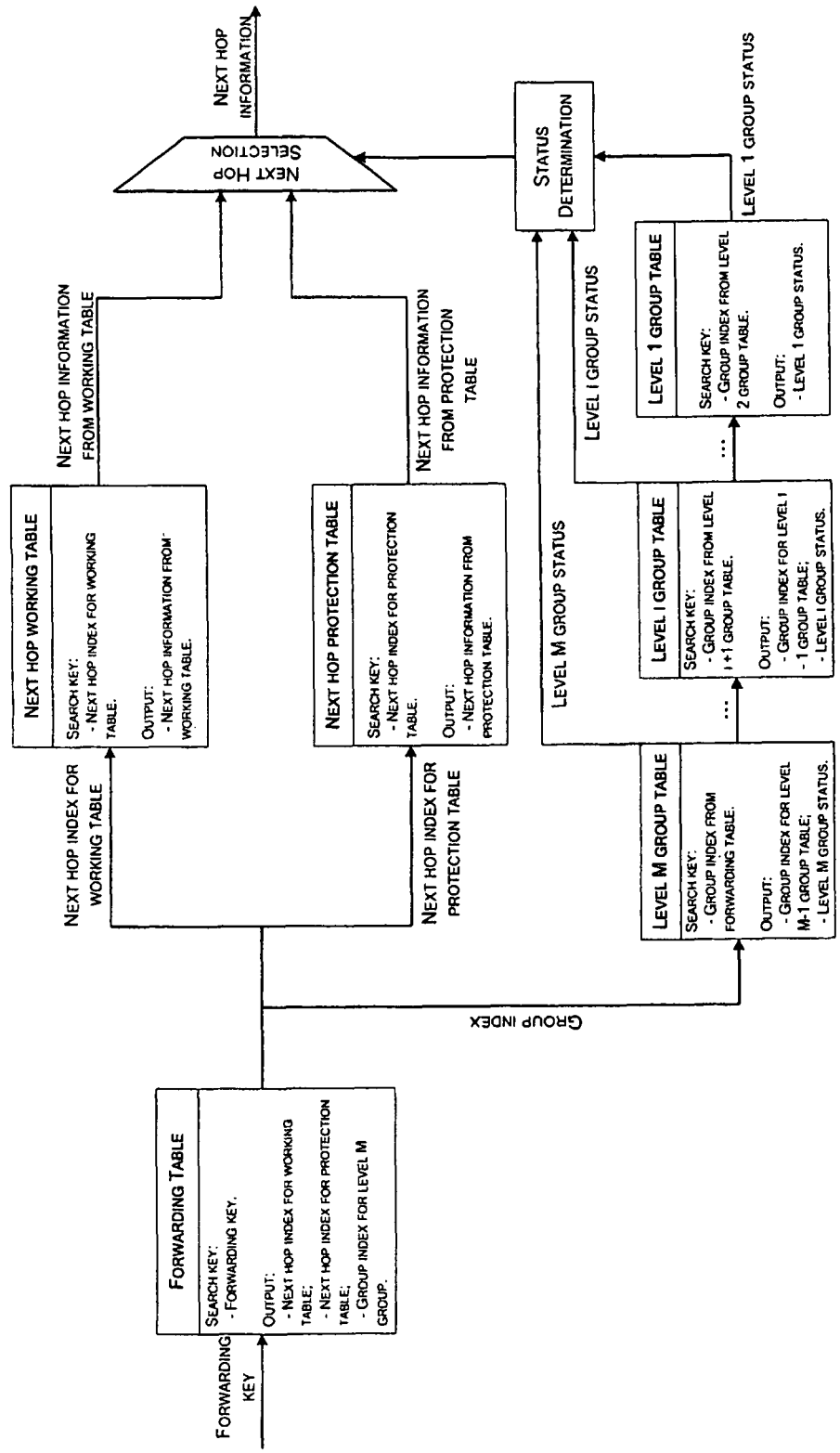
FIG. 3 is a schematic diagram illustrating a path switching process according to an embodiment of the present invention.

According to an embodiment of the present invention, the statuses of all the groups, i.e., the statuses of all the corresponding tunnels into which the traffic flow is multiplexed, are determined by the failure status determining unit 110, as shown in FIG. 3. The forwarding unit 120 will forward the traffic flow via the second path if the failure status determining unit 110 determines that any of the group statuses is the failure status. On the other hand, the forwarding unit 120 will forward the traffic flow via the first path if the failure status determining unit 110 determines that none of the group status is the failure status.

Alternatively, the forwarding unit 120 can forward the traffic flow via the second path once the failure status determining unit 110 determines any of the group statuses is the failure status. That is, once the failure status determining unit 110 determines that any group status is the failure status, it may stop the determination on the statuses of the remaining groups, which may further reduce the switching time.

As noted above, if a lower level tunnel is failed, the higher level tunnels multiplexed into the lower level tunnel are failed accordingly. Thus, in an alternative embodiment, a failure status is set for level n+1 tunnel if a level n tunnel into which the level n+1 tunnel is multiplexed is set as failure status, wherein n is an integer no smaller than 1. In this way, it is possible for the switching node to detect the failure in the working path even more quickly, especially in the case where the failure status determining unit 110 is configured to judge from the highest level tunnel whether the tunnel on each of the levels into which the incoming traffic flow is multiplexed is of the failure status.

In order to forward the incoming traffic flow via the second path, the forwarding unit 120 forwards the traffic flow to the next hop in the second path as determined by the next hop determining unit. On the other hand, in order to forward the incoming traffic flow via the first path, the forwarding unit 120 forwards the traffic flow to the next hop in the first path as determined by the next hop determining unit.

According to an embodiment, a normal status can be reset for a tunnel when a failure is recovered for the tunnel.

Herein, the failure/recovery of a tunnel can be detected by an OAM protocol running on the corresponding level or by status information reported from the physical layer (for level 1).

Figure 4:
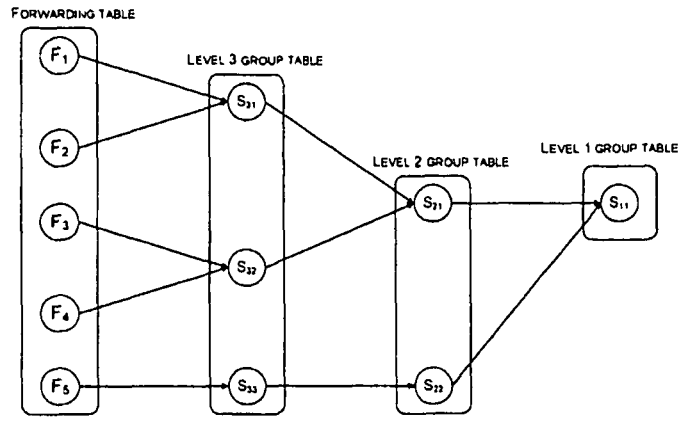
FIG. 4 is a schematic diagram showing an exemplary multiplexing hierarchy.

FIG. 4 is a schematic diagram showing an exemplary multiplexing hierarchy, i.e., grouping relationship, for the working path. FIG. 4 shows, by way of example, five traffic flows $F_1, F_2, F_3, F_4$ and $F_5$. As shown, the traffic flows $F_1$ and $F_2$ are multiplexed into a level 3 tunnel (group) $S_{31}$, the traffic flows $F_3$ and $F_4$ are multiplexed into a level 3 tunnel (group) $S_{32}$, and the traffic flows $F_5$ is multiplexed into a level 3 tunnel (group) $S_{33}$. Then, the level 3 tunnels (groups) $S_{31}$ and $S_{32}$ are multiplexed into a level 2 tunnel (group) $S_{21}$, and level 3 tunnel (group) $S_{33}$ is multiplexed into a level 2 tunnel (group) $S_{22}$. Finally, the level 2 tunnels (groups) $S_{21}$ and $S_{22}$ are multiplexed into a level 1 tunnel (group) $S_{11}$. Therefore, the following grouping relationship can be obtained:

$F_1 \in S_{31}, F_2 \in S_{31}, F_3 \in S_{32}, F_4 \in S_{32}, F_5 \in S_{33}$;
$S_{31} \in S_{21}, S_{32} \in S_{21}, S_{33} \in S_{22}$; and
$S_{21} \in S_{11}, S_{22} \in S_{11}$.

Thus, in the forwarding table, the traffic flows $F_1$ and $F_2$ will be indexed to the group $S_{31}$, the traffic flows $F_3$ and $F_4$ will be indexed to the level 3 group $S_{32}$, and the traffic flows $F_5$ will be indexed to the level 3 group $S_{33}$. In the level 3 group table, the groups $S_{31}$ and $S_{32}$ will be indexed to the level 2 group $S_{21}$, the group $S_{33}$ will be indexed to the level 2 group $S_{22}$. In the level 2 group table, the group $S_{21}$ and $S_{22}$ will be indexed to the level 1 group $S_{11}$.

For example, in response to the detection of a failure in the tunnel $S_{21}$, the traffic flows $F_1, F_2, F_3$ and $F_4$ will be switched to the protection path. In response to the detection of a failure in the tunnel $S_{31}$, the traffic flows $F_1$ and $F_2$ will be switched to the protection path. In response to the detection of a failure in the tunnel $S_{11}$, all of the traffic flows $F_1$ to $F_5$ will be switched to the protection path.

Figure 2:
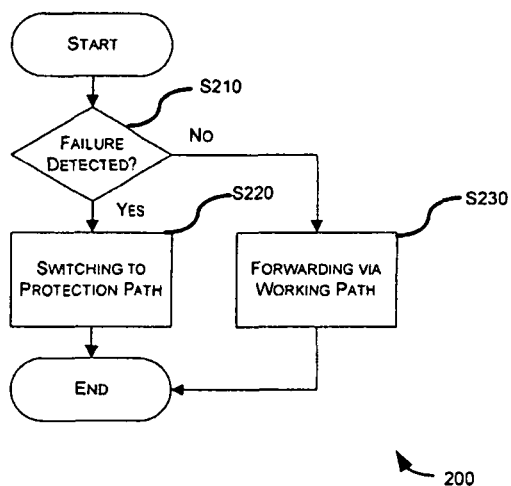
FIG. 2 is a flowchart illustrating the path switching method according to an embodiment of the present invention.

Reference is now made to FIG. 2, which is a flowchart illustrating the path switching method 200 according to an embodiment of the present invention. The method 200 can be carried out by any node in a network which is capable of protection switching, such as but not limited to an ingress edge router in a MPLS domain.

As noted above, an incoming traffic flow is multiplexed into a tunnel (i.e., a highest level tunnel). Further, one or more higher level tunnels are multiplexed into a lower level tunnel, so as to form a multiplexing hierarchy.

At step S210, it is determined for an incoming traffic flow whether any of tunnels on the first path of all levels into which the incoming traffic flow is multiplexed is of a failure status.

At step S220, the incoming traffic flow is forwarded via the second path if any of the tunnels on the first path of all levels into which the incoming traffic flow is multiplexed is determined to be of a failure status at step S210.

At step S230, the incoming traffic flow is forwarded via the first path if none of the tunnels on the first path of all levels into which the incoming traffic flow is multiplexed is determined to be of a failure status at step S210.

According to an embodiment, the determining step S210 may comprise: judging, from the highest level tunnel, whether the tunnel on each of the levels into which the incoming traffic flow is multiplexed is of the failure status.

According to a preferred embodiment of the method 200, a failure status is set for an $(n+1)^{th}$ level tunnel if an $n^{th}$ level tunnel into which the $(n+1)^{th}$ level tunnel is multiplexed is set as failure status, wherein n is an integer no smaller than 1.

According to an embodiment, the method 200 may further comprise: extracting a forwarding key from the incoming traffic flow, before the determining step S210. In this case, the method 200 can further comprise a step of determining both a next hop in the first path and a next hop in the second path based on the extracted forwarding key.

According to an embodiment of the method 200, for forwarding the incoming traffic flow via the second path, the traffic flow is forwarded to the determined next hop in the second path; and for forwarding the incoming traffic flow via the first path, the traffic flow is forwarded to the determined next hop in the first path.

Figure 5:
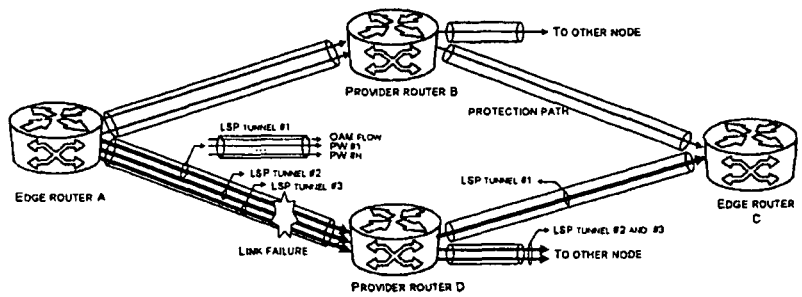
FIG. 5 is a schematic diagram showing an exemplary scenario of protection switching according to an embodiment of the present invention.
Figure 6:
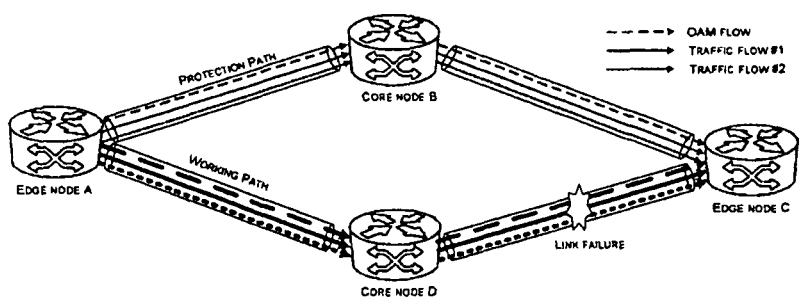
FIG. 6 is a schematic diagram showing an exemplary scenario of the prior art protection switching.

FIG. 5 is a schematic diagram showing an exemplary scenario of protection switching according to an embodiment of the present invention.

As shown in FIG. 5, there are two LSPs created between the edge router A and the edge router C, that is, a working path through the provider router D and a protection path through the provider node B. A number of PWs are multiplexed into each LSP, with traffic flows multiplexed into each PW. The OAM for detecting the failure, i.e., connectivity loss, runs on the LSP level.

The present invention can be applied to the edge node A. Accordingly, the PWs can be regarded as level 3 tunnels (groups), the LSPs can be regarded as level 2 tunnels (groups), and the physical links from the edge node A to provider router D can be regarded as level 1 tunnels (groups). The PWs multiplexed into a same LSP #1 (PW#1 to PW#n in the figure) will have their group indexes indexed to that LSP #1, and LSPs multiplexed into the same physical link (three LSPs between the router A and the router D in the figure) will have their group indexes indexed to that physical link.

If there is a LSP failure in the working path (for example, a LSP failure between the provider router D and edge router C), the level 2 group corresponding to the failed LSP will be set to the failure state. For an incoming traffic flow multiplexed into a PW which is in turn multiplexed into the failed LSP, it is determined whether any of the corresponding PW, LSP and physical link into which the traffic flow is multiplexed is of a failure status. In this case, in response to the determination of the failure status of the level 2 tunnel (LSP), the traffic flow will be forwarded to the protection path, typically by pushing a different LSP label and redirecting the packet to the protection path port.

If there is a physical link failure between the edge router A and the provider router D, the level 1 group corresponding to the failed physical link will be set to the failure state. In this case, all the traffic flows running on the physical link will be switched to the protection path.

If a network does not support protection switching, it is possible to configure half of the traffic flows to use the next hop information from the next hop working table and the other half of the traffic flows to use the next hop information from the next hop protection table, so that both tables can be fully utilized without any waste.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

I claim:

1. A path switching method in a network comprising at least a first path and a second path, the method comprising:
   forwarding, by a path switching apparatus, an incoming traffic flow via the first path, wherein for the first path, one or more traffic flows are multiplexed into a tunnel, and one or more higher level tunnels are multiplexed into a lower level tunnel;
   for the incoming traffic flow, determining, by the path switching apparatus, that out of a plurality of tunnels on the first path of all levels into which the incoming traffic flow is multiplexed, any one of the plurality of tunnels is of a failure status; and
   forwarding, by the path switching apparatus, the incoming traffic flow via the second path instead of the first path based on the determination.

2. The path switching method according to claim 1, wherein the determining step comprises:
   judging, from the highest level tunnel, whether the tunnel on each of the levels into which the incoming traffic flow is multiplexed is of the failure status.

3. The path switching method according to claim 1, wherein a failure status is set for an (n+1)th level tunnel if an nth level tunnel into which the (n+1)th level tunnel is multiplexed is set as failure status, wherein n is an integer no smaller than 1.

4. The path switching method according to 1, further comprising:
   extracting a forwarding key from the incoming traffic flow, before the determining step; and
   determining both a first next hop in the first path and a second next hop in the second path based on the extracted forwarding key.

5. The path switching method according to claim 4, wherein
   for forwarding the incoming traffic flow via the second path, the incoming traffic flow is forwarded to the determined second next hop in the second path, and
   for forwarding the incoming traffic flow via the first path, the incoming traffic flow is forwarded to the determined first next hop in the first path.

6. The path switching method according to claim 4, wherein determining both the first next hop in the first path and the second next hop in the second path comprises referring to a forwarding table.

7. The path switching method according to claim 6, wherein determining both the first next hop in the first path and the second next hop in the second path further comprises referring to a next hop working table, a next hop protection table, and a number of group tables each for one level.

8. The path switching method according to claim 1, further comprising:
- for the incoming traffic flow, determining that none of the tunnels on the first path of all levels into which the incoming traffic flow is multiplexed is of the failure status; and
- forwarding the incoming traffic flow via the first path.

9. The path switching method according to claim 1, wherein the path switching method is implemented in a router.

10. The path switching method according to claim 1, wherein the failure status of a tunnel is detected by an Operation, Administration, and Management (OAM) protocol.

11. A path switching apparatus in a network comprising at least a first path and a second path, the apparatus comprising:
- a failure status determining unit configured to determine, for an incoming traffic flow, whether out of a plurality tunnels on the first path of all levels into which the incoming traffic flow is multiplexed, one tunnel is of a failure status; and
- a forwarding unit configured to, forwarding the incoming traffic flow via the first path, wherein for the first path, one or more traffic flows are multiplexed into a tunnel, and one or more higher level tunnels are multiplexed into a lower level tunnel, and forward the incoming traffic flow via the second path instead of the first path, if the failure status determining unit determines that any one of the plurality of tunnels on the first path of all levels into which the incoming traffic flow is multiplexed is of the failure status.

12. The path switching apparatus according to claim 11, wherein the failure status determining unit is further configured to judge, from the highest level tunnel, whether the tunnel on each of the levels into which the incoming traffic flow is multiplexed is of the failure status.

13. The path switching apparatus according to claim 11, wherein a failure status is set for an (n+1)th level tunnel if an nth level tunnel into which the (n+1)th level tunnel is multiplexed is set as failure status, wherein n is an integer no smaller than 1.

14. The path switching apparatus according to 11, further comprising:
- a next hop determining unit configured to extract a forwarding key from the incoming traffic flow, and determine both a first next hop in the first path and a second next hop in the second path based on the extracted forwarding key.

15. The path switching apparatus according to claim 14, wherein
- for forwarding the incoming traffic flow via the second path, the forwarding unit is configured to forward the incoming traffic flow to the determined second next hop in the second path, and
- for forwarding the incoming traffic flow via the first path, the forwarding unit is configured to forward the incoming traffic flow to the determined next hop in the first path.

16. The path switching apparatus according to claim 14, wherein the next hop determining unit is further configured to refer to a forwarding table in determining both the first next hop in the first path and the second next hop in the second path.

17. The path switching apparatus according to claim 16, wherein the next hop determining unit is further configured to maintain a next hop working table, a next hop protection table, and a number of group tables each for one level.

18. The path switching apparatus according to claim 11, wherein the forwarding unit is further configured to forward the incoming traffic flow via the first path if the failure status determining unit determines that none of the tunnels on the first path of all levels into which the incoming traffic flow is multiplexed is of the failure status.

19. The path switching apparatus according to claim 11, wherein the path switching apparatus is a router.

20. The path switching apparatus according to claim 11, wherein the failure status of a tunnel is detected by an Operation, Administration, and Management (OAM) protocol.

* * * * *